July 20, 1965      D. L. ECKLEY      3,195,782

COMBINED DISPENSING CARTON AND MEASURING CUP

Filed Aug. 31, 1964      3 Sheets-Sheet 1

INVENTOR:
Dorothy L. Eckley
BY
ATTORNEYS

July 20, 1965  D. L. ECKLEY  3,195,782
COMBINED DISPENSING CARTON AND MEASURING CUP
Filed Aug. 31, 1964  3 Sheets-Sheet 2

INVENTOR.
Dorothy L. Eckley
BY
*McGrew and Edwards*
ATTORNEYS

July 20, 1965     D. L. ECKLEY     3,195,782
COMBINED DISPENSING CARTON AND MEASURING CUP
Filed Aug. 31, 1964     3 Sheets-Sheet 3
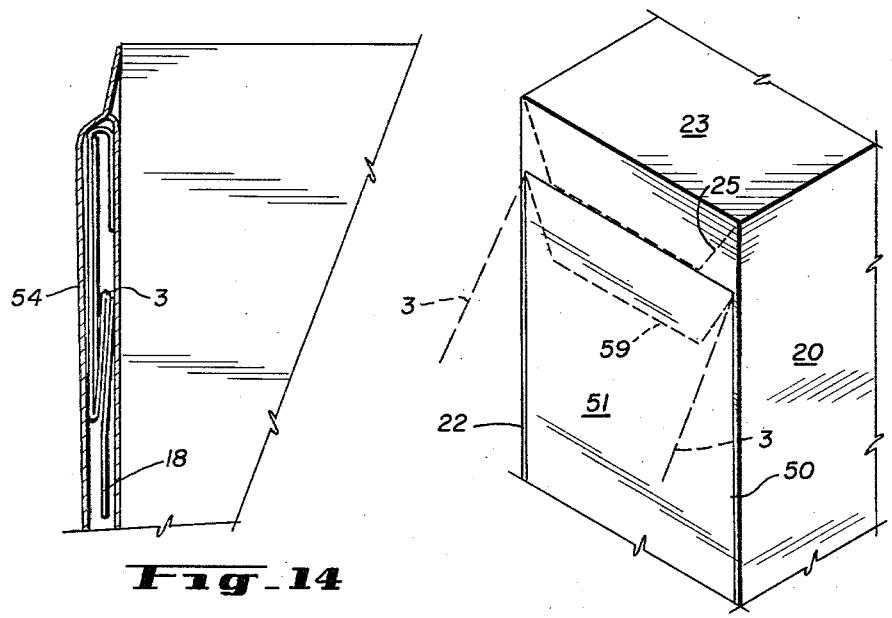
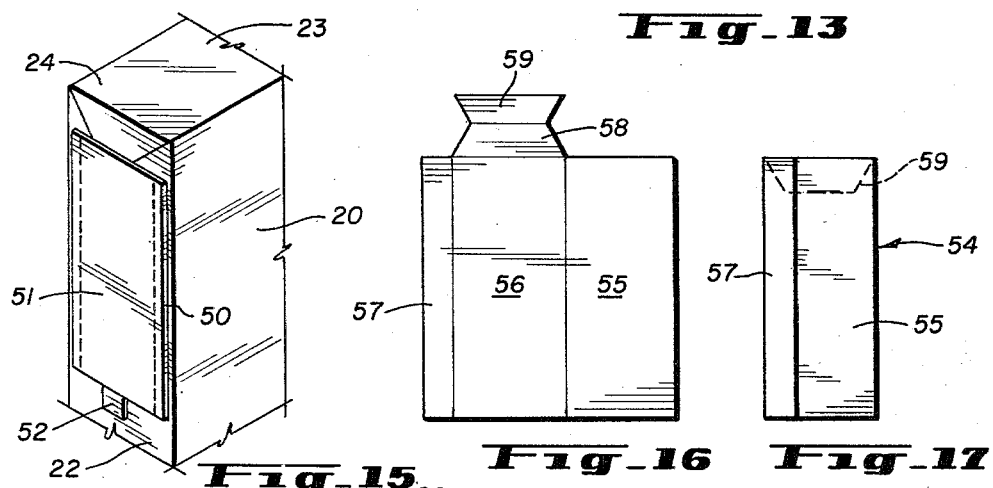
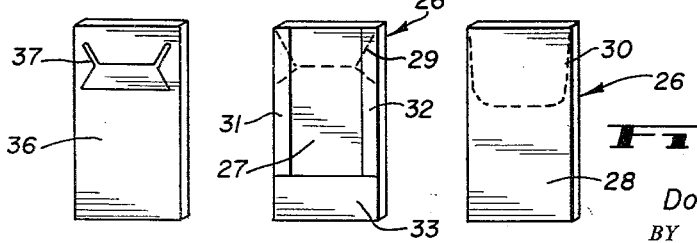
INVENTOR.
Dorothy L. Eckley
BY
ATTORNEYS United States Patent Office 3,195,782
Patented July 20, 1965

3,195,782
COMBINED DISPENSING CARTON AND
MEASURING CUP
Dorothy L. Eckley, 270 Marshall St., Lakewood 26, Colo.
Filed Aug. 31, 1964, Ser. No. 393,212
15 Claims. (Cl. 222—158)

This is a continuation-in-part of application Serial No. 129,694 filed August 7, 1961, now U.S. Patent No. 3,146,914.

This invention relates generally to dispensing carton-measuring cup combinations and more particularly to related embodiments and improvements in dispensing carton-measuring cup combinations of the type disclosed in my copending application Serial No. 129,694, filed August 7, 1961 now U.S. Patent No. 3,146,914.

As related in my copending application, there are many granular products packaged in dispensing cartons which products are used in carefully measured quantities. As was discussed there, it is necessary in dispensing carton-measuring cup combinations to provide convenient discharge without spillage, rigidity in the cup when opened, and simplicity in withdrawing the cup from a folded position.

Accordingly, it is the object of this invention to provide improvements in cup configuration and mountings on the carton for facilitating product discharge into the cup.

Another object of this invention is to provide a dispensing carton-measuring cup combination in which the cup after filling may be emptied without manipulation of the carton to which it is attached.

Another object of this invention is to provide a foldable cup which is easily opened into the receiving position.

It is another object of this invention to provide a dispensing carton-measuring cup combination in which the cup can be folded and attached to the carton's interior or exterior adjoining the pouring opening.

It is a further object of this invention to provide improvements for maintaining the cup in an open position for receiving the product to be measured.

Further objects and advantages of this invention will become apparent as the following description proceeds and the features of novelty which characterize this invention will be pointed out with particularity in the claims annexed to and forming part of this specification.

The practice of this invention will be described with reference to the accompanying drawings, in the several views in which like parts bear similar reference numerals. In the drawings:

FIG. 8 is a perspective view of reduced size of a reinforcing member employed in the embodiment shown in FIG. 5;

FIG. 9 is a perspective view of the front of the envelope shown in FIG. 6 but in a folded position;

FIG. 10 is a perspective view of the rear of the folded envelope shown in FIG. 9;

FIG. 13 is a perspective view of an embodiment of this invention with the bag mounted on the exterior of the carton and its open position indicated by dash lines;

FIG. 14 is a partial sectional view of the bag mounting shown in FIG. 13 with the bag in a folded position;

FIG. 15 is a perspective view to reduced scale of the embodiment shown in FIG. 13 illustrating the cover member;

FIG. 16 is a plan view to reduced size of the envelope for the embodiment of FIG. 13; and FIG. 17 is a side elevation view of the envelope shown in FIG. 16 but in a folded position.

Figure 1:
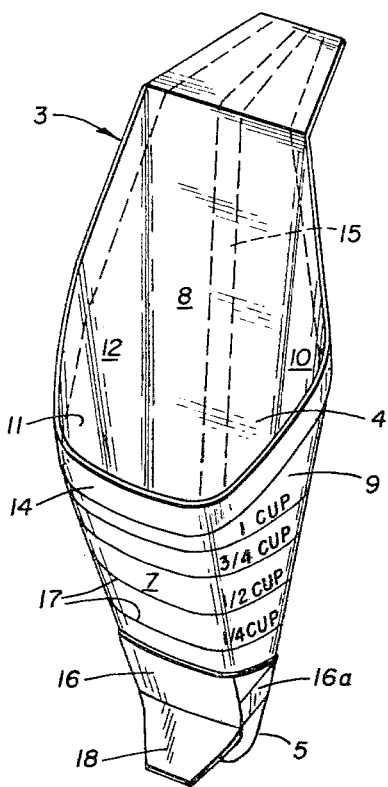
FIG. 1 is a perspective view of a bag embodying my invention in an open position.

Referring now to the drawings, there is illustrated in FIG. 1 the bag 3 for receipt of granular product from the carton. This bag 3 is generally funnel-shaped having a top opening 4 and apexing at the bottom 5 with the intermediate body being of a six-sided configuration including, as viewed from the front, a front side 7, back side 8, a pair of sloping adjoining right sides 9, 10, and a pair of sloping adjoining left sides 11, 12. These sides define six corners along which the bag is folded. Sides 7, 9 and 11 are of equal height and sides 8, 10 and 12 are of substantially greater height to form a top extension on extended portion 13 which is attached at its upper end to the carton adjoining the pouring opening in a manner to be described more fully hereinafter.

Bag 3 includes additional layers of sufficient stiffness and thickness to hold the bag in an open position as shown in FIG. 1 when supported in a depending position on the outside of the carton. These layers include a top layer 14 extending along the top edge or rim of the top opening 4, a back layer 15 extending centrally of back side 8 and a bottom cup-like layer 16 in the bottom of the bag having reinforcing portions 16a which spread the bag at its bottom. These layers may be provided of the same material as the bag body or of a stiffer material such as paper, cardboard or the like. Top layer 14 may be provided by folding the bag body one or several turns. Bag 3 generally is preferably constructed of a flexible transparent or semi-transparent plastic which is easily folded and can be drawn to the open position with ease where it expands to the spread position shown in FIG. 1.

The measuring cup portion of the bag extends from the bottom of the bag to just below the rim layer 14 and includes graduations 17 illustrated in cup fractions on the side of the bag at various elevations. A tab 18 extends from near the bottom of the bag to assist in drawing it from the folded to the open or spread position.

Figure 2:
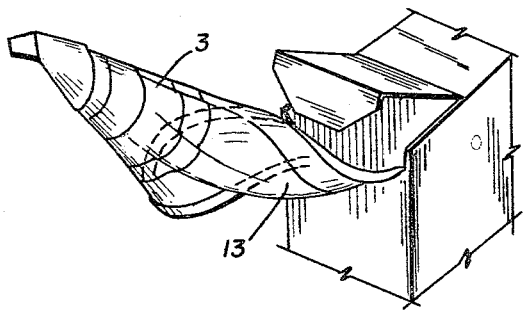
FIG. 2 is a perspective view of reduced size of the open bag shown in FIG. 1 attached to a dispensing carton with the bag shown in an inverted discharging position.

In FIG. 2 there is shown the bag 3 attached to a dispensing container in which the bag is twisted along its extended portion 13 so as to discharge the measured granular content from the cup portion without inverting the attached carton. Extended portion 13 is of sufficient flexibility and length to allow full discharge of the bag contents with relative ease.

Figure 4:
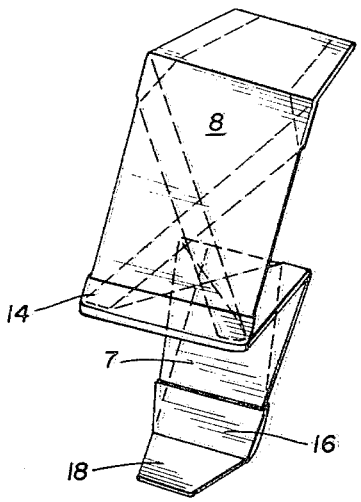
FIG. 4 is a perspective view of the bag shown in FIG. 1 showing the folds along its ends as at the beginning of a bag opening manipulation.
Figure 3:
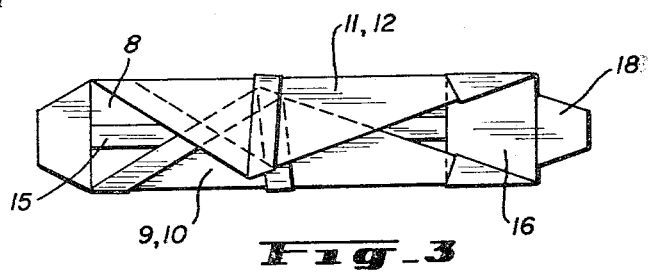
FIG. 3 is a rear plan view of the bag of FIG. 1 shown folded along its corners as for packaging.

Referring now to FIGS. 3 and 4 there is shown the folds of the bag 3 for its enclosure in an envelope and attachment to the carton. The back support 15 of the bag has not been shown in FIG. 4 to avoid confusion of crossing lines, but it is understood that the bag illustrated in FIG. 1 is being discussed throughout. Here the bag is shown in a flattened position with back side 8 pressing against front side 7, right sides 9, 10 pressed together, and left sides 11, 12 pressed together. Right sides 9, 10 fold rearwardly at corresponding corners of the front and back sides and press against back side 8. Left sides 11, 12 fold rearwardly at correponding corners of the front and back sides and overlap right sides 9, 10 so that the bag as folded along its corners is subtantially the width of the front and rear sides 7, 8.

Bag 3 is folded along its ends as shown in FIG. 4 by a fold rearwardly just below the top layer 14 and forwardly approximately in the center of the measuring cup portion. The folded bag is enclosed in an envelope which is attached to an upright wall of the dispensing carton in several ways more particularly described hereinafter.

Figure 5:
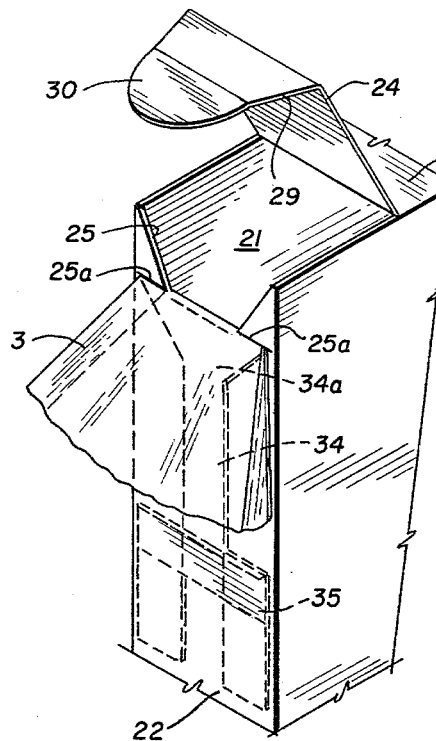
FIG. 5 is a perspective view of a fragmentary embodiment of an open bag attached to the interior of the dispensing carton.

In one embodiment illustrated in FIGS. 5–10, a folded bag is mounted on the interior of the dispensing carton. Dispensing carton 20 is shown in FIG. 5 as a hollow boxlike body in an upright position for containing a granular product (not shown) which is more fully described in my copending application referred to above. An opening 21 is provided in carton 20 by scoring an upright wall 22 and along the edges of top 23 which, when separated as shown, provide a flap 24 for closing the carton after a dispensing operation. The scored portion of upright wall 22 is narrower at the bottom and wider at the top providing a spout or pouring opening 25 having tapering sides which aid in directing the granular product into the bag. Additional scoring 25a extends from the bottom of the pouring opening 25 horizontally to substantially the sides of carton 20 to allow the sides of bag 3 to extend across the width of the carton side 22 thus decreasing the possibility of spillage and assisting in maintaining the bag in an open position. The diameter of the bag 3 as described with reference to FIG. 1 is substantially greater than the pouring opening 25 and the width of upright wall 22.

Figures 6, 7:
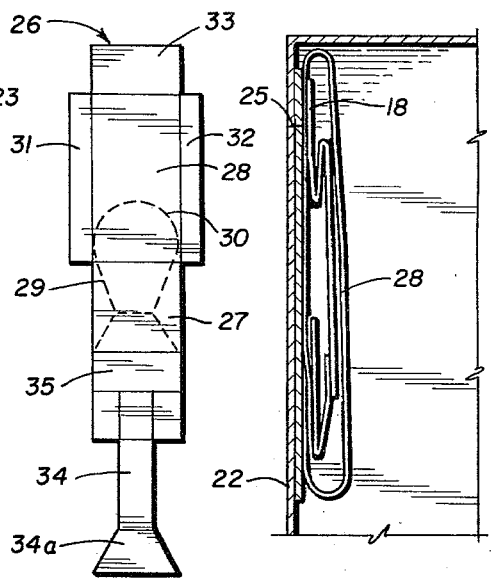
FIG. 6 is a plan view of reduced size of the envelope for the bag enclosure for the embodiment shown in FIG. 5.
FIG. 7 is a partial sectional view of the bag enclosed in the envelope of the embodiment shown in FIG. 5.

An envelope for one interior mounting arrangement is illustrated unfolded in FIG. 6 and is folded with bag enclosed as shown in FIGS. 9 and 10. This envelope 26 includes a forward face 27 and a rearward face 28. Forward face 27 and a scored portion 29 and rearward face 28 has a scored portion 30 and are ruptured when the scoring on the carton 20 is separated. Rear face 28 has side flaps 31, 32 and an end flap 33 for folding along their edges to complete the enclosure of the bag. Front face 27 includes a bag support member 34 having an end 34a shaped to conform to the top end of bag 3 for attachment thereto. When the bag has been extended to the open position as is shown in FIG. 5, support member 34 extends along the inner surface of the upright wall 22 with end 34a adjoining the pouring spout bottom. Envelope 26 also includes a reinforced portion 35 where support 34 attaches thereto to strengthen the attachment of the bag to the envelope.

Folded envelope 26 nests in a reinforcing member 36 of generally the same size and shape which attaches to the inner surface of upright side 22 adjoining the pouring opening. Member 36 is slotted at the pouring opening to conform to the scoring 29 which is ruptured when the carton scoring is separated.

In the operation of this embodiment the scored portions of carton 20 are separated thus pulling portions 29 and 30 from the top of the envelope. Tab 18 which extends upwardly (FIG. 7) is grasped and pulled through opening 21 extending the bag over the bottom edge of the pouring spout. The sides of the bag are fitted in scored portion 25a and the bag is opened by pulling up and outwardly with the tab 18.

Figure 11:
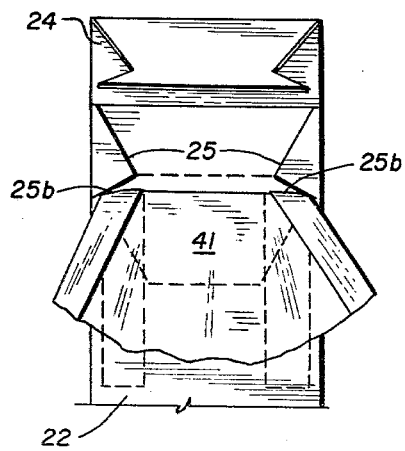
FIG. 11 is a partial front elevation view of an alternative embodiment for mounting the bag on the interior of the carton.
Figure 12:
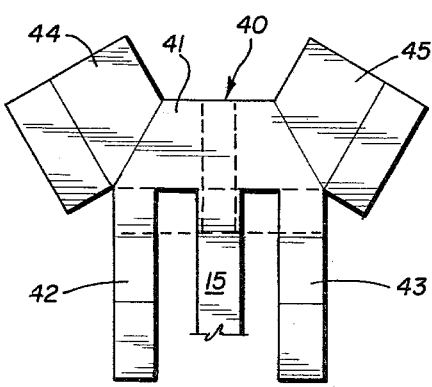
FIG. 12 is a plan view of the backing member employed in FIG. 11.

An alternative embodiment for the interior bag mounting is shown in FIGS. 11 and 12 in which pouring spout 25 has an additional scored portion 25b which curves downwardly toward the sides of the carton. The bag 3 is attached to a backing member 40 which is mounted on the interior of the upright wall 22 with its top surface near pouring opening 25. Backing member 40 includes a body portion 41 which is the same structure as represented at 34a in FIG. 6 and has arms 42, 43 which attach to the back of the bag 3. Arms 44 and 45 extend from the sides of body portion 41 and fold against the front of the bag as indicated by the dotted lines to provide a rigid attaching member to the interior of the upright side wall 22 below the pouring opening 25.

An embodiment for mounting the bag on the exterior of the carton is illustrated in FIGS. 13–17. This embodiment is illustrated with a carton 20 having scoring in its upright wall and top to provide a pouring spout or opening 25 similar to those of FIG. 5 previously described. A cover member 50 (FIG. 15) is arranged on the exterior of the upright wall 22 below the pouring opening, which member is of sufficient length to cover the folded bag and envelope assembly. Cover member 50 has a central scored portion 51 with a tab member 52 disposed at its lower end. The upper end is attached to the carton immediately below the lower edge of the pouring spout as shown in FIG. 15.

The envelope for this embodiment shown in FIGS. 16, 17 includes a forward face 55, a rear face 56 and a side flap 57 which fold to enclose the bag. An end flap extends from the top of rear face 56 and includes similarly shaped adjoining portions 58, 59, the latter of which is attached to the end of the bag which folds along the top of face 56 and is secured between portions 58 and 59. Forward face 55 is attached to the inner surface of cover member scored portion 51 and is thereby ruptured and removed when scored portion 51 is detached.

As noted in FIG. 14 the folded bag 3 enclosed within folded envelope 54 is inverted with respect to the interior mounting illustrated in FIG. 7. In FIG. 14 tab 18 extends downwardly at the bottom of the envelope. In extending the bag to an open position in this embodiment, tab member 52 is grasped pulling away scored portion 51 and part of outer envelope face 55. The scored portion of the carton forming the pouring opening is separated. Tab member 18 is pulled downwardly and the forward portion of the bag 3 is extended outwardly by such action.

Although specific embodiments of this invention have been illustrated and described, various modifications will occur to those skilled in the art. Therefore, it is not desired that this invention be limited to the specific details illustrated and described and it is intended by the appended claims to cover all modifications which fall within the spirit and scope of this invention.

I claim:

1. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portions, a generally funnel-shaped flexible bag having six sides and a top extension which is secured adjoining the bottom scored portion for suspension of the bag adjoining the pouring opening with its top spread open, the diameter of the open top of the bag being substantially greater than the maximum width of the pouring opening, the bag having at least double layers of sufficient stiffness disposed along its top edge, along its back and in its lower portion for maintaining the top open while the bag is suspended for reception of granular material poured through said pouring opening.

2. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portions, a generally funnel-shaped flexible bag having six sides and a top extension which is secured adjoining the bottom scored portion for suspension of the bag adjoining the pouring opening with its top spread open, the diameter of the open top of the bag being substantially greater than the maximum width of the pouring opening, the bag having at least double layers of sufficient stiffness disposed along its top edge, along its back and in its lower portion for maintaining the top open while the bag is suspended for reception of granular material poured through said pouring opening, and the top extension of the bag being of sufficient length and flexibility to allow twisting thereof to discharge contained granular material in the bag while the carton is maintained in an upright position.

3. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portions, and scored portions extending from said pouring opening bottom to substantially the sides of said body, a generally funnel-shaped flexible bag having six sides and a top extension being secured on the interior of said upright wall and extending through the pouring opening and over the bottom scored portion substantially the width of the scored portion along the bottom of said pouring opening for suspension of the bag adjoining the pouring opening with its top spread open, the diameter of the open top of the bag being substantially greater than the maximum width of the pouring opening, the bag having at least double layers of sufficient stiffness disposed along its top edge, along its back and in its lower portion for maintaining the top open while the bag is suspended through the pouring opening for reception of granular material poured through said pouring opening.

4. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portions, a generally funnel-shaped flexible bag having six sides and a top extension which is secured adjoining the exterior of said upright wall and extends substantially the width of said upright wall for suspension of the bag adjoining the pouring opening with its top spread open, the diameter of the open top of the bag being substantially greater than the maximum width of the pouring opening, the bag having at least double layers of sufficient stiffness disposed along its top edge, along its back and in its lower portion for maintaining the top open while the bag is suspended adjoining the pouring opening for reception of granular material poured through said pouring opening.

5. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portion, a separable envelope disposed on said upright wall and having surfaces secured on a surface of the body adjoining the scored portion so as to be ruptured when the scored portion is separated, a flexible bag disposed within said envelope, said bag being generally funnel-shaped and having six sides which define six corners along which the bag is folded for fitting in the envelope prior to opening the pouring opening, the bag having a top extension secured adjoining the bottom scored portion for suspension of the bag adjoining the pouring opening with its top spread open, the diameter of the open top of the bag being substantially greater than the maximum width of the pouring opening, the bag having at least double layers of sufficient stiffness disposed along its top edge, along its back and in its lower portion for maintaining the top open while the bag is suspended adjoining the pouring opening for reception of granular material poured through said pouring opening.

6. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portion, a separable envelope disposed on said upright wall and having surfaces secured on a surface of the body adjoining the scored portion so as to be ruptured when the scored portion is separated, a flexible bag disposed within said envelope, said bag being generally funnel-shaped and having six sides which define six corners along which the bag is folded and including at least one endwise fold for fitting in the envelope prior to opening the pouring opening, the bag having a top extension secured adjoining the bottom scored portion for suspension of the bag adjoining the pouring opening with its top spread open, the diameter of the open top of the bag being substantially greater than the maximum width of the pouring opening, the bag having at least double layers of sufficient stiffness disposed along its top edge, along its back and in its lower portion for maintaining the top open while the bag is suspended adjoining the pouring opening for reception of granular material poured through said pouring opening.

7. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portion, a separable envelope disposed on said upright wall and having surfaces secured on a surface of the body adjoining the scored portion so as to be ruptured when the scored portion is separated, a flexible bag disposed within said envelope, the envelope including lengthwise and endwise folds for containing the bag, said bag being generally funnel-shaped and having six sides which define six corners along which the bag is folded for fitting in the envelope prior to opening the pouring opening, the bag having a top extension secured adjoining the bottom scored portion for suspension of the bag adjoining the pouring opening with its top spread open, the diameter of the open top of the bag being substantially greater than the maximum width of the pouring opening, the bag having at least double layers of sufficient stiffness disposed along its top edge, along its back and in its lower portion for maintaining the top open while the bag is suspended adjoining the pouring opening for reception of granular material poured through said pouring opening.

8. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portion, a separable envelope disposed on said upright wall and having surfaces secured on a surface of the body adjoining the scored portion so as to be ruptured when the scored portion is separated, a flexible bag disposed within said envelope, said bag being generally funnel-shaped and having six sides which define six corners along which the the bag is folded for fitting in the envelope prior to opening the pouring opening, the bag having a top extension secured adjoining the bottom scored portion for suspension of the bag adjoining the pouring opening with its top spread open, the diameter of the open top of the bag being substantially greater than the maximum width of the pouring opening, the bag having at least double layers of sufficient stiffness disposed along its top edge, along its back and in its lower portion for maintaining the top open while the bag is suspended adjoining the pouring opening for reception of granular material poured through said pouring opening, and a tab attached adjacent the bottom of the bag for pulling the bag from its folded position to an extended position for opening the bag.

9. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portions, a separable envelope disposed on the interior of said upright wall and having surfaces secured on a surface of the body adjoining the scored portion so as to be ruptured when the scored portion is separated, a flexible bag disposed within said envelope, said bag being generally funnel-shaped and having six sides which define six corners along which the bag is folded for fitting in the envelope prior to opening the pouring opening, the bag having a top extension secured on the interior of said upright wall for suspension of the bag through the pouring opening with its top spread open, the diameter of the open top of the bag being substantially greater than the maximum width of the pouring opening, the bag having at least double layers of sufficient stiffness disposed along its top edge, along its back and in its lower portion for holding the top open while the bag is suspended through the pouring opening for reception of granular material poured through said pouring opening.

10. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portions, a separable envelope disposed on the exterior of said upright wall and having surfaces secured on a surface of the body adjoining the scored portion so as to be ruptured when the scored portions are separated, a flexible bag disposed within said envelope, said bag being generally funnel-shaped and having six sides which define six corners along which the bag is folded for fitting in the envelope prior to opening the pouring opening, the bag having a top extension secured on the exterior of said upright wall for suspension of the bag adjoining the pouring opening with its top spread open, the diameter of the open top of the bag being substantially greater than the maximum width of the spout, the bag having at least double layers of sufficient stiffness disposed along its top edge, along its back and in its lower portion for holding the top open while the bag is suspended adjoining the pouring opening for reception of granular material poured through said pouring opening.

11. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portions, and a scored portion extending from said pouring opening to substantially the corresponding sides of said body, a backing member disposed on the interior of said upright wall and having an opening corresponding with said pouring opening, an envelope disposed on said backing member and having surfaces secured on an inner surface of the scored upright wall so as to be ruptured when said scored portions are separated, a flexible bag disposed within said envelope, said bag being generally funnel-shaped and having six sides which define six corners along which the bag is folded for fitting in the envelope prior to opening the pouring opening, the bag having a top extension secured on the interior of said upright wall by attachment to a portion of the envelope, the bag in a receiving position extends through the pouring opening and over the scored portion extending from the pouring opening substantially its width for suspension of the bag adjoining the pouring opening with its top spread open, the diameter of the open top of the bag being substantially greater than the maximum width of the pouring opening, the bag having at least double layers of sufficient stiffness disposed along its top edge, along its back and in its lower portion for maintaining the top open while the bag is suspended for reception of granular material poured through said pouring opening.

12. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portions, and a scored portion extending from said pouring opening to substantially the corresponding sides of said body, a backing member disposed on the interior of said upright wall and having an opening corresponding with said pouring opening, an envelope disposed on said backing member and having surfaces secured on an inner surface of the scored upright wall so as to be ruptured when said scored portions are separated, a flexible bag disposed within said envelope, said bag being generally funnel-shaped and having six sides which define six corners along which the bag is folded for fitting in the envelope prior to opening the pouring opening, the bag having a top extension secured on the interior of said upright wall by attachment to the backing member adjoining the pouring opening, the bag in a receiving position extends through the pouring opening and over the scored portion extending from the pouring opening substantially its width for suspension of the bag adjoining the pouring opening with its top spread open, the diameter of the open top of the bag being substantially greater than the maximum width of the pouring opening, the bag having at least double layers of sufficient stiffness disposed along its top edge, along its back and in its lower portion for maintaining the top open while the bag is suspended for reception of granular material poured through said pouring opening.

13. A combined dispensing carton and measuring cup for granular materials, comprising a hollow box-like body adapted to stand in an upright position and providing a complete enclosure for its granular content when filled, the box having a scored portion in one upright wall adjacent its top defining a terminus of its top portion, said scored portion being narrower at the bottom and wider at the top whereby to form a pouring opening with tapering sides after separation of the scored portions, a cover member disposed on the exterior of said upright wall having a scored portion joining with said box scored portion, an envelope disposed on the exterior of said upright wall and covered by said cover member, said envelope having surfaces secured on said cover scored portion so as to be ruptured when its scored portions are separated, a flexible bag disposed within said envelope, said bag being generally funnel-shaped and having six sides which define six corners along which the bag is folded for fitting in the envelope prior to opening the pouring opening, the bag having a top extension secured on the exterior of said upright wall adjoining the pouring opening for suspension of the bag adjoining the pouring opening with its top spread open, the diameter of the open top of the bag being substantially greater than the maximum width of the pouring opening, the bag having at least double layers of sufficient stiffness disposed along its top edge, along its back and in its lower portion for maintaining the top open while the bag is suspended for reception of granular material poured through said pouring opening.

14. A measuring and dispensing bag for granular materials having means for its attachment to a carton in which such granular material is stored, comprising a generally funnel-shaped bag of transparent flexible material having six sides and a top extension for connection with such a carton in proximity to a pouring opening of the carton, said sides defining six corners along which the bag is folded to flatten it for storage when the carton is sealed, the bag having stiffened resilient portions disposed along its top edge, along its back and in its lower portion which spread when the bag is not confined so as to maintain the top open and the sides separated for reception of granular material discharged through the pouring opening of the carton, and indicia on the bag representing increments of measurement of the contents of the bag.

15. A measuring and dispensing bag for granular materials having means for its attachment to a carton in which such granular material is stored, comprising a generally funnel-shaped bag of transparent flexible material having six sides and a top extension for connection with such a carton in proximity to a pouring opening of the carton, said sides defining six corners along which the bag is folded to flatten it for storage when the carton is sealed, the bag having double layers of sufficient stiffness disposed along its top edge, along its back and in its lower portion which spread when the bag is not confined so as to maintain the top open and the sides separated for reception of granular material discharged through the pouring opening of the carton, and indicia on the bag representing increments of measurement of the contents of the bag.

References Cited by the Examiner
UNITED STATES PATENTS

| 2,770,403 | 11/56 | Eckley | 222—424.5 |
| 2,820,491 | 1/58 | Kromsten | 222—158 X |

M. HENSON WOOD, JR., *Primary Examiner.*